United States Patent Office 3,453,904
Patented July 8, 1969

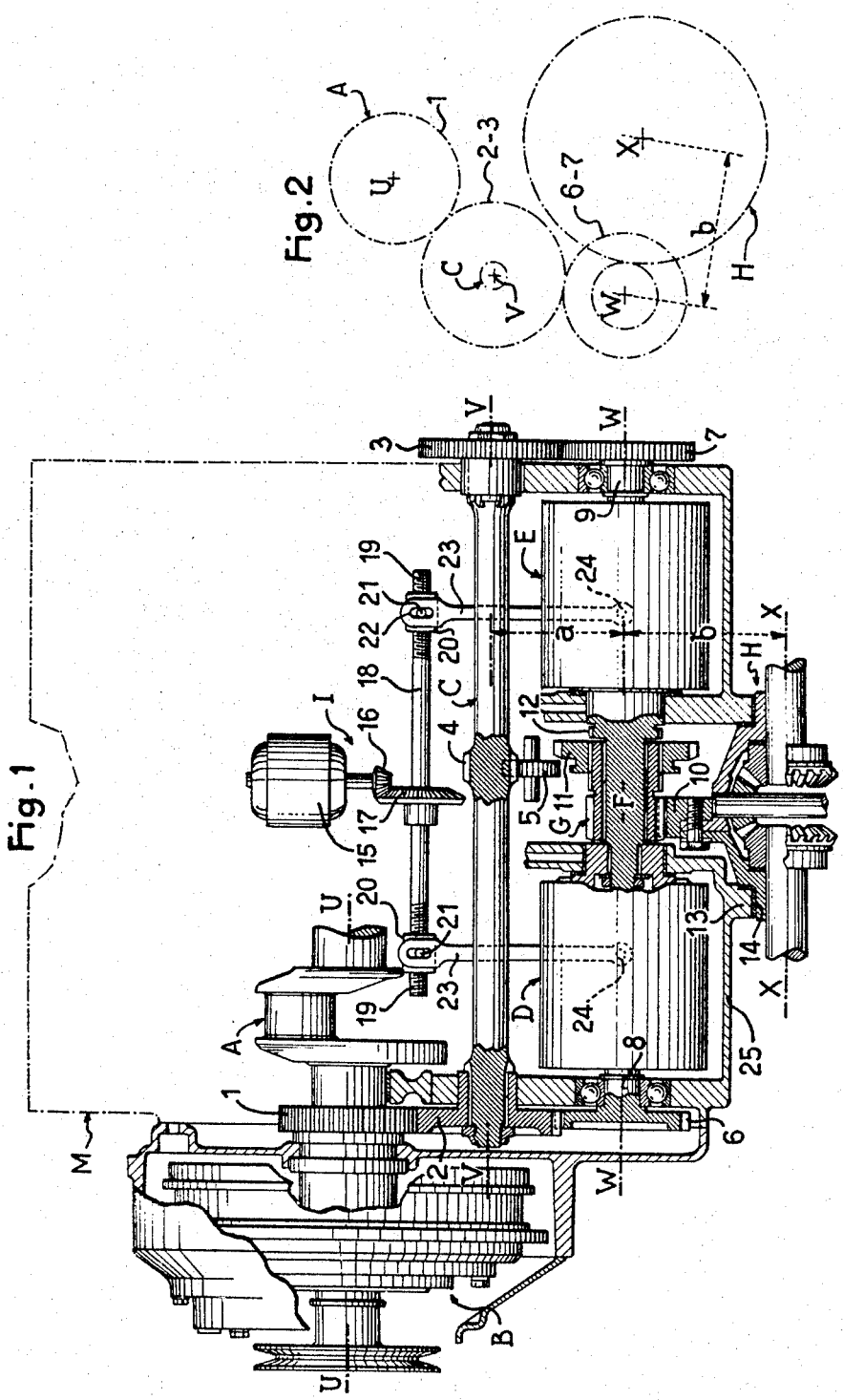

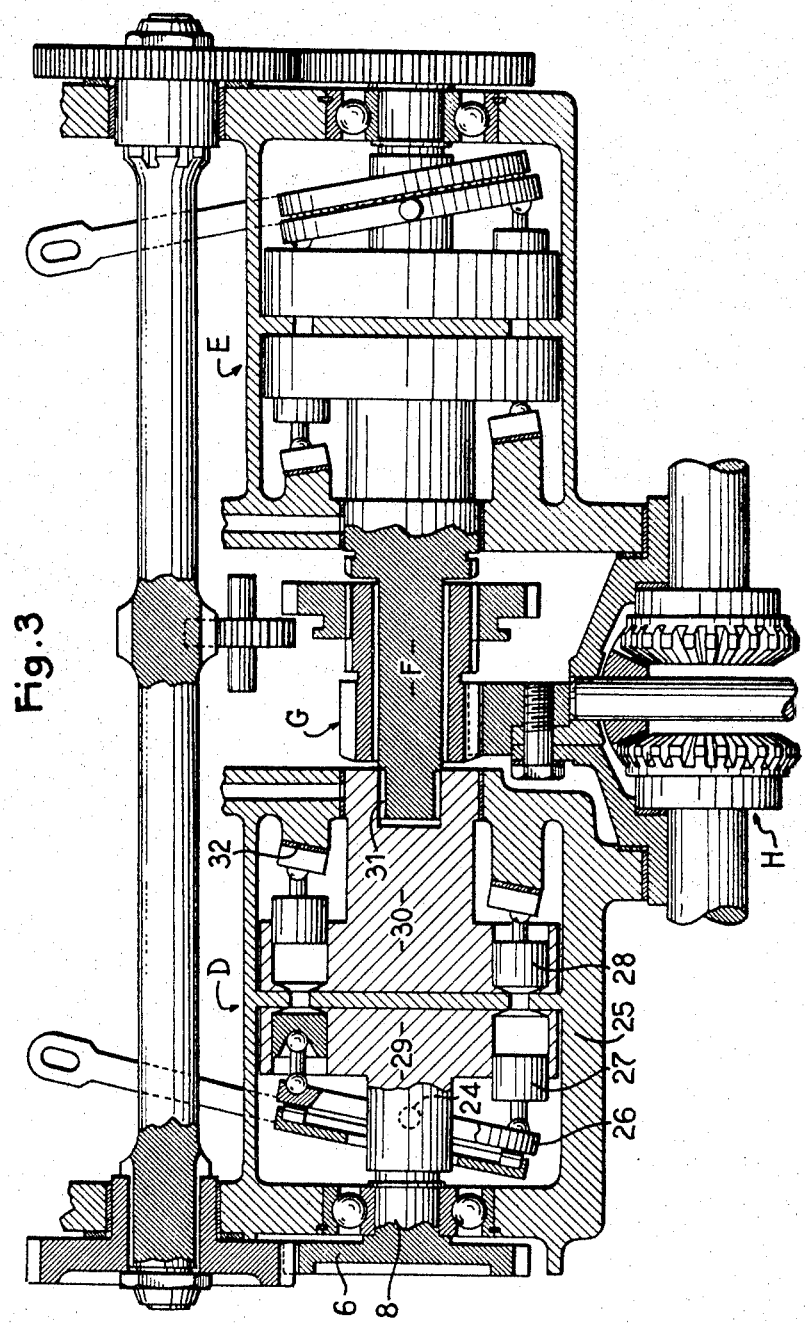

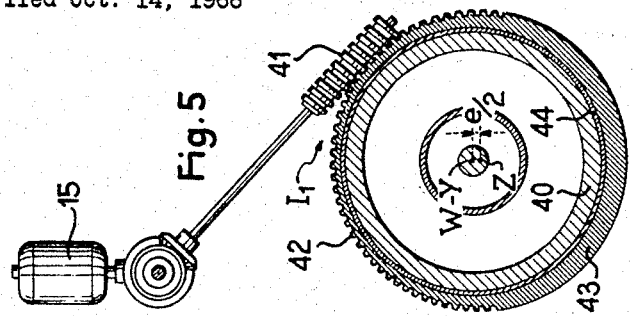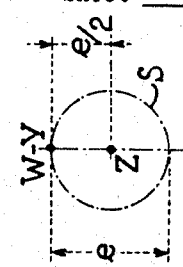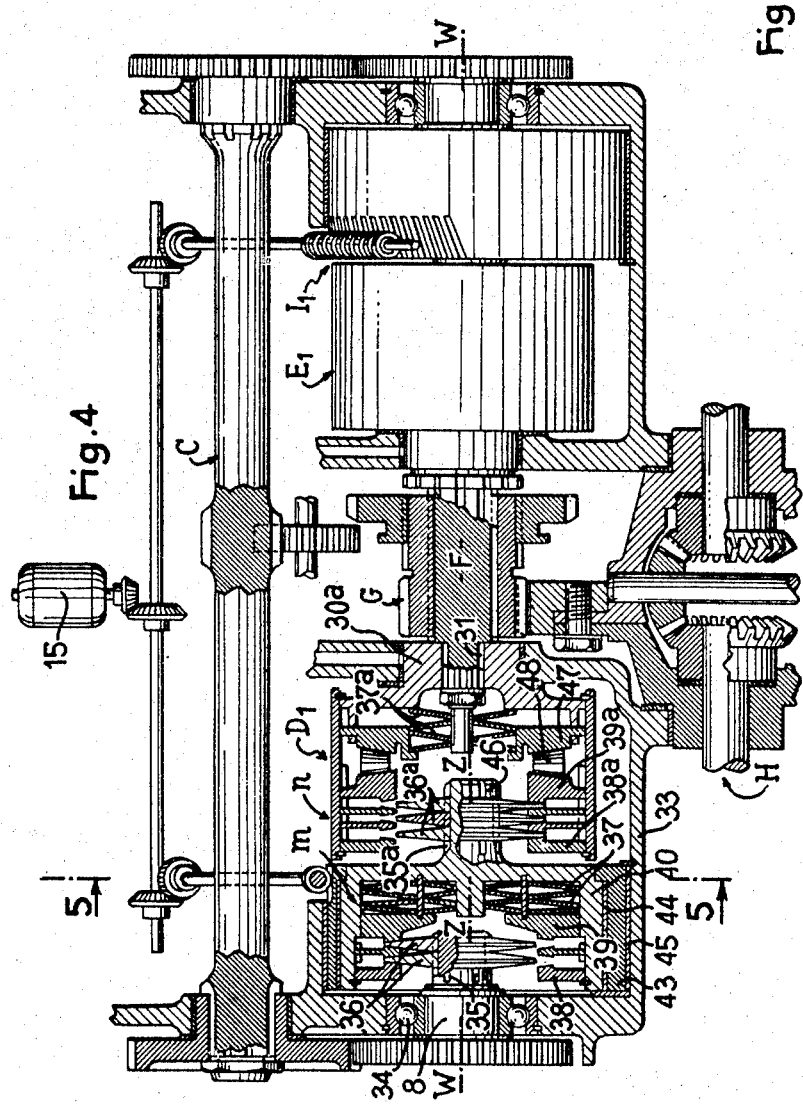

3,453,904
TRANSMISSION MECHANISM FOR AUTOMOBILE VEHICLES AND THE LIKE
Marcel Dangauthier, Paris, France, assignor to Societe Industrielle et Commerciale des Automobiles Péugeot, Paris, France, a French body corporate
Filed Oct. 14, 1966, Ser. No. 586,787
Claims priority, application France, Dec. 24, 1965, 43,640
Int. Cl. F16h 37/06
U.S. Cl. 74—664                                                 11 Claims

ABSTRACT OF THE DISCLOSURE

A transmission mechanism, more particularly but not exclusively, for vehicles having a transverse driving unit, comprising an engine crankshaft, an intermediate transmission shaft having an axis parallel to but distant from the axis of said crankshaft; means drivingly connecting said crankshaft to said intermediate shaft; two speed variators for effecting a continuous speed variator operatively connected to said intermediate shaft to be driven in parallel by said intermediate shaft, said variators being coaxial and their common axis being parallel to the axis of said crankshaft; an output shaft common to said two speed variators; and a receiving element, such as a differential, operatively connected to said output shaft to be driven by said output shaft.

---

The present invention relates to transmisions for automobile vehicles and the like and more particularly, but not exclusively, to transmissions for vehicles having a transverse driving unit.

The object of the invention is to provide a improved transmission mechanism having a continuous speed variation which permits coupling the crankshaft of a drive unit to the crown gear of a differential or any other receiving device, said mechanism having an extremely small overall size for a given transmitted torque, which is of particular importance in the case of a vehicle or the like having a transverse drive unit since the space available in the immediate vicinity of the engine is usually limited.

According to the invention, said transmission mechanism comprises in combination with a crankshaft of the engine an intermediate transmission shaft havng an axis parallel to but distant from the axis of the crankshaft; means drivingly connecting said crankshaft to said intermediate shaft; two speed variators for achieving a continuous speed variation and driven in parallel by said intermediate shaft and located on a common axis parallel to the axes of the crankshaft and the intermediate shaft; an output shaft common to the two speed variators and coaxial with their axes and connected to the receiving device, and a control device for varying in synchronism the transmission ratios of the two speed variators whereby said ratios are constantly equal.

According to another feature of the invention, in the case where the receiving device is a differential, the axis of the crown gear and satellite gears, that is, the axis of the output shafts of the differential is parallel to the aforementioned axes.

Owing to the parallel arrangement of the two variators, each of which transmits one-half of a given total transmitted torque, these variators can be of small size, which reduces the overall space taken up by the transmission mechanism, and they can drive the crown gear of the differential or other receiving device directly through a gear element mounted on the common output shaft of the two variators.

According to another feautre, in the case of a structure which must include a reverse speed, an idler gear element is mounted on the common output shaft of the two variators which is capable of being connected by a mobile gear either to said shaft or directly to the intermediate shaft through a rotation reversing gear.

The two variators can be of various types and two examples thereof will be given hereinafter.

Further features and advantages of the invention will be apparent from the ensuing description with reference to the accompanying drawings.

In the drawings:

FIG. 1 is an assembly view of the transmission mechanism according to the invention combined with the crankshaft of a drive unit;

FIG. 2 is a diagrammatic end elevational view of the relative positions of the four parallel axes of the mechanism;

FIG. 3 is a longitudinal sectional view, on an enlarged scale, of the transmission mechanism having two speed variators of known type including a swingable plate;

FIG. 4 is a view similar to FIG. 3 in the case of variators having biconical friction discs;

FIG. 5 is a partial sectional view of the variators shown in FIG. 4, taken along line 5—5 of FIG. 4, and FIG. 6 is a digrammatic view, on an enlarged scale, of the center part of FIG. 5.

FIG. 1 shows a transmission mechanism partly in section, the variators being shown in elevation. FIG. 2 represents the actual relative positions of the axes of the mechanism.

The mechanism comprises in combination with the crankshaft A of a drive or propelling engine unit M, a coupling B which drives an intermediate drive shaft C. The latter drives in parallel two speed variators D and E whose common output shaft F drives a gear element G which directly drives the crown gear of a differential H, the continuous variation of the transmission ratio of the variators D and E being ensured by common control means I so that the two transmission ratios are constantly strictly identical.

The assembly is so positioned that the axis U—U of the crankshaft A, V—V of the intermediate shaft C, W—W of the two variators D and E and X—X of the differential H are parallel and very close to each other with relative positions which could be, for example, those shown in FIG. 2.

As mentioned hereinbefore, the fact that the transmission of the torque of the intermediate shaft C to the differential H is ensured by the two variators in parallel D and E each of which transmits one-half of the torque, these variators can be of small size so that the distance $b$ between the axis X—X and Y—Y can be small and the differential H can be driven directly by the output shaft F through the gear element G without interposition of a countergear.

There will now be given some details concerning the various transmission devices, it being understood that these details are not intended to limit the scope of the invention. Two embodiments of known types of the variators B and E will then be described.

The crankshaft A drives in the known manner the driving part of the coupling B whose purpose is to uncouple the engine unit M from the transmission when the vehicle is stationary and ensure a smooth starting. This coupling can be of any type, for example of the well-known Jaeger powder type, but it is adapted in such manner that the output of the movement is effected through a gear 1 coaxial with the crankshaft A. The gear 1 directly drives a gear 2 keyed on the intermediate shaft C which has, keyed on its other end, another gear 3 identical to the gear 2. Further, the shaft C carries, approximately in its middle part, a gear 4 which is machined directly on the shaft and employed, as will be understood hereinafter, for the reverse speed, this gear being permanently meshed with a countergear 5.

The identical gears 2 and 3 rotate in the same direction at the same speed and are meshed respectively with two gears 6 and 7 keyed on the input shafts 8 and 9 of the variators D and E. Disposed between the variators D and E is the common variator output shaft F on which the gear G is idle, this idler gear meshing with the crown gear 10 of the differential H.

The idler gear G can be connected to the shaft F common to the two variators or to the countergear 5 pertaining to the reverse speed by means of a sliding or mobile gear 11 which is slidably keyed on the gear G and capable of engaging either outer splines 12 on the shaft F or the countergear 5.

For the forward speeds the sliding gear 11 is shifted to the right (as viewed in FIG. 1) so as to engage the splines 12 whereas for reverse speed it is shifted to the left so as to engage the gear 5.

In order to reduce the centre distance $b$ between the axis W—W of the variators and the axis X—X of the differential H, the latter can be mounted on bushings 13 and thrust bearing rings 14, as shown.

The device I controlling the variators D and E comprises, for example, an electric motor 15 which rotates through bevel gears 16–17, a shaft 18 having end portions 19 which are screw-threaded in opposite directions so as to shift nuts 20 equal distances in opposite directions. The nuts 20 engage through journals 21 slots 22 formed in levers 23 which are pivotable about pins 24 on the housings 25 of the variators so as to actuate inside each of the latter an element which varies the transmission ratio. This element can consist, for example as shown in FIG. 3, of a plate 26 which swings in the housing 25 about the axis of the pin 24 and against which bear the pistons 27 of a hydraulic pump, this fluid discharged by said pistons actuating the pistons 28 of a receiving motor.

The pump body 29 is rigid with the input shaft 8 of the variator whereas the body 30 of the motor is keyed at 31 on the output shaft F in respect of the variator D and integral with the shaft F in respect of the resistor E. The pistons 28 of the motor part of the variator bear against a plate 32 having a fixed inclination.

It will be understood that for a given rotational speed of the pump body 29, that is, of the input shaft 8, the rotational speed of the motor body 30 depends on the inclination given to the plate 26 by the control device I.

Reference will now be had to FIGS. 4 and 6 which show another type of variator having biconical discs operated by friction.

As in the foregoing embodiment, two parallel variators $D^1$ and $E^1$ are provided. These variators have the same arrangement except that the common output shaft F constitutes directly the output shaft of the right variator $E^1$ (as viewed in FIG. 4) whereas the output element 30$^a$ of the left variator $D^1$ is keyed at 31 on this shaft F.

The left variator $D^1$ will be described. It comprises, in the same way as the right variator $E^1$ in fact two elementary variators $m$ and $n$ in series relation. It includes the input shaft 8 carrying the gear 6. This shaft is journalled, as in the embodiment shown in FIG. 3, in the fixed housing 33 by means of a rolling bearing 34.

The shaft 8 has at its end splines 35 which drive in rotation the biconical discs 36 of the first elementary friction variatior $m$. These discs, the number of which is a function of the torque to be transmitted, slide axially on the splines 35 and are clamped, for example due to the effect of Belleville washers 37, by conical elements 38 annd 39 which are located inside an element 40 in the form of a socket or bell having an axis Y—Y. The element 39 is slidable in the element 40 whereas the element 38 is axially stationary therein.

The socket element 40 is transversely movable under the action of a control device $I_1$ (FIGS. 4 and 5) so as to give the axis Y—Y of the element 40 a variable eccentricity relative to the axis W—W of the input shaft 8.

In the presently described embodiment, the mechanism $I_1$ comprises, as in the preceding embodiment, a motor 15 whose output shaft drives, in respect of each variator, a screw 41 (FIG. 5). The latter engages a toothed sector 42 formed on the outer face of a collar 43 located between the cylindrical wall of the housing 33 and the socket element 40. This collar 43 has an inner cylindrical face 44 which is eccentric to the extent of $e/2$ relative to its outer face 45 whose axis Z—Z is also eccentric to the extent of $e/2$ relative to the axis W—W.

It will be understood that upon rotation of the collar 43 having the eccentric face, the axis Y—Y, which coincides with the axis W—W in FIG. 5, describes about the axis Z—Z a cylindrical surface represented by the line S in FIG. 6 and having a radius $e/2$ so that the eccentricity between the axes W—W and Y—Y of the shaft 8 and the axis of the element 40 varies from nil (FIGS. 5 and 6 where the axes W—W and X—X coincide at W, Y) to the value $e/2+e/2=e$ (FIGS. 4 and 6). The ratio of the speeds between the speed of the gear 6 and that of the element 40 is of course maximum when the eccentricity has the maximum value $e$ whereas it is nil (direct drive) when the eccentricity is zero. Consequently, the gearing down varies in a continuous manner.

The second elementary variator $n$ having biconical discs is disposed in series with the first variator $m$ and can have an identical construction or comprise a system of ramps and rollers as shown in the drawing. It comprises in this case biconical discs 36$^a$ which are identical to the discs 36 and slide in the same way as the latter on splines 35$^a$ on the shank 46, having an axis Y—Y, of the socket element 40. The biconical discs 36$^a$ are clamped between the axially fixed member 38$^a$ and the member 39$^a$ against which bears in an indirect manner a member 47 subjected to the action of week Belleville washers 37$^a$ which apply a low axial force on this member. The members 39$^a$ and 47 are provided with ramps between which rollers 48 are disposed. Consequently a small torque can be transmitted under the action of said axial force. When the torque increases, the member 47 is urged to the right (as viewed in FIG. 4) under the action of the ramps and rollers 48 and bears against the output member 30$^a$ having an axis W—W. The axial force is proportional to the applied torque.

To obtain a correct operation, the travel of the member 47 due to the ramps must be greater than the axial travel of the member 39$^a$ due to the variation in the eccentricity produced by the movement of the socket element 40 and the shank 46.

Such an arrangement of ramps and rollers, which can also be employed in the first elementary variator $m$, varies the axial force as a function of the torque to be transmitted and thus prolongs the life of the variator $D^1$ or $E^1$.

Although specific embodiments of the invention have been described, many modifications and changes may be made therein without departing from the scope of the invention as defined in the appended claims.

Having now described my invention what I claim as new and desire to secure by Letters Patent is:

1. A transmission mechanism comprising an engine crankshaft, an intermediate transmission shaft having an axis parallel to but distant from the axis of said crankshaft; means drivingly connecting said crankshaft to said intermediate shaft; two speed variators for effecting a continuous speed variator operatively connected to said intermediate shaft to be driven in parallel by said intermediate shaft, said variators being coaxial and their common axis being parallel to and distant from the axis of said crankshaft and the axis of said intermediate shaft, respectively; an output shaft common to said two speed variators and coaxial with their common axis; and a receiving element operatively connected to said output shaft to be driven by said output shaft.

2. A transmission mechanism as claimed in claim 1, wherein said receiving element is a differential having two output shafts which have axes parallel to the axis of said intermediate shaft.

3. A transmission mechanism as claimed in claim 1, wherein said means connecting said crankshaft to said intermediate shaft is a coupling having an output gear coaxial with the axis of said crankshaft.

4. A transmission mechanism as claimed in claim 1, wherein said variators are hydraulic variators having a swashplate whose inclination relative to the axis of the variator is adjustable, control means being operatively connected to said swashplate for adjusting said inclination.

5. A transmission mechanism as claimed in claim 1, wherein each of said variators comprises a plurality of elementary variators connected in series.

6. A transmission mechanism as claimed in claim 1, further comprising an electric motor, a shaft operatively connected to said electric motor to be rotatively driven by said motor, said shaft having two portions which are screwthreaded in opposite directions, two nuts respectively engaged on said portions and two control levers actuated by said nuts and which are adapted respectively to control one of said variators.

7. Automobile vehicle comprising a transverse drive unit having a crankshaft; a differential; and a transmission mechanism comprising an intermediate transmission shaft having an axis parallel to but distant from the axis of said crankshaft; means drivingly connecting said crankshaft to said intermediate shaft; two speed variators for effecting a continuous speed variator operatively connected to said intermediate shaft to be driven in parallel by said intermediate shaft, said variators being coaxial and their common axis being parallel to and distant from the axis of said crankshaft and the axis of said intermediate shaft, respectively; an output shaft common to said two speed variators and coaxial with their common axis; said common output shaft being drivingly connected to said differential.

8. A transmission mechanism comprising an engine crankshaft, an intermediate transmission shaft having an axis parallel to the axis of said crankshaft; means drivingly connecting said crankshaft to said intermediate shaft; two speed variators for effecting a continuous speed variator operatively connected to said intermediate shaft to be driven in parallel by said intermediate shaft, said variators being coaxial and their common axis being parallel to the axis of said crankshaft; an output shaft common to said two speed variators; and a receiving element operatively connected to said output shaft to be driven by said output shaft, an idler gear rotatably mounted on said common output shaft and drivingly meshed with said receiving element, a movable gear combined with said idler gear to be rotated by said idler gear, drive teeth rigid with said common output shaft, and a countergear combined with to be driven by said intermediate shaft, said movable gear being movable between a first position in which it is in engagement with to be driven by said drive teeth on said common output shaft and a second position in which it is meshed with said countergear so as to be driven by said intermediate shaft through said countergear.

9. A transmission mechanism as claimed in claim 8, wherein said countergear is combined with said intermediate shaft by a gear which is rigid with said intermediate shaft and meshed with said countergear.

10. A transmission mechanism comprising an engine crankshaft, an intermediate transmission shaft; a coupling connecting said crankshaft to said intermediate shaft, said coupling having an output gear coaxial with the axis of said crankshaft; two speed variators for effecting a continuous speed variator operatively connected to said intermediate shaft to be driven in parallel by said intermediate shaft, said variators being coaxial and their common axis being parallel to the axis of said crankshaft; an output shaft common to said two speed variators; and a receiving element operatively connected to said output shaft to be driven by said output shaft, said intermediate shaft comprising two gears rigid with the latter, one of which gears is directly meshed with said output gear of said coupling, each of said two variators having an input shaft and an input gear keyed on the corresponding input shaft, said two gears rigid with the intermediate shaft being respectively meshed with said input gears.

11. A transmission mechanism as claimed in claim 10 wherein each of said variators comprises a plurality of elementary variators in series.

References Cited
UNITED STATES PATENTS 3,006,206    10/1961    Kelley et al.    74—199
3,119,281    1/1964    Gerber et al.    74—701

FOREIGN PATENTS 1,159,280    12/1963    Germany.

FRED C. MATTERN, Jr., *Primary Examiner.*

JAMES A. WONG, *Assistant Examiner.*

U.S. Cl. X.R.
74—190.5, 199, 701